United States Patent
Sethuraman et al.

(10) Patent No.: US 12,532,024 B2
(45) Date of Patent: *Jan. 20, 2026

(54) DECODER-SIDE MOTION VECTOR REFINEMENT (DMVR) PROCESS METHOD AND APPARATUS

(71) Applicant: HUAWEI TECHNOLOGIES CO., LTD., Guangdong (CN)

(72) Inventors: Sriram Sethuraman, Karnataka (IN); Jeeva Raj A, Karnataka (IN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/346,795

(22) Filed: Jul. 4, 2023

(65) Prior Publication Data

US 2024/0007666 A1 Jan. 4, 2024

Related U.S. Application Data

(63) Continuation of application No. 17/394,598, filed on Aug. 5, 2021, now Pat. No. 11,722,691, which is a (Continued)

(30) Foreign Application Priority Data

Sep. 19, 2018 (IN) .............................. 201831035309

(51) Int. Cl.
*H04N 19/557* (2014.01)
*G06T 3/4007* (2024.01)
(Continued)

(52) U.S. Cl.
CPC ......... *H04N 19/557* (2014.11); *G06T 3/4007* (2013.01); *H04N 19/521* (2014.11); *H04N 19/53* (2014.11); *H04N 19/573* (2014.11)

(58) Field of Classification Search
CPC .... H04N 19/557; H04N 19/521; H04N 19/53; H04N 19/573; G06T 3/4007
See application file for complete search history.

(56) References Cited

U.S. PATENT DOCUMENTS

2006/0198445 A1 9/2006 Li et al.
2008/0037641 A1 2/2008 Qiu et al.
(Continued)

FOREIGN PATENT DOCUMENTS

CN 102215386 A 10/2011
CN 105530516 A 4/2016
(Continued)

OTHER PUBLICATIONS

Xiu et. al. "CE9.1.3: Complexity reduction on decoder-side motion vector refinement (DMVR)", Document: JVET-K0342; Joint Video Experts Team (JVET) of ITU-T SG 16 WP 3 and ISO/IEC JTC 1/SC 29/WG 11, 11th Meeting: Ljubljana, SI, Jul. 10-18, 2018.*
(Continued)

*Primary Examiner* — Shahan Ur Rahaman

(57) ABSTRACT

Methods and apparatuses of determining an alignment level between motion compensated reference patches for reducing motion vector refinement steps are provided. According to one method, obtaining, by a decoder, motion compensated interpolated samples based on sub-pixel accurate merge motion vectors from a bilinear motion compensated interpolation; computing, by the decoder, a sum of absolute differences (SAD) between two motion compensated reference patches using a subset of the motion compensated interpolated samples; determining, by the decoder, whether the SAD is less than a coding unit (CU) size-dependent threshold value; when the SAD is less than the CU size-dependent threshold value: skipping remaining decoder-side motion vector refinement (DMVR) process steps; and performing final motion compensation; and when the SAD is (Continued)

not less than the CU size-dependent threshold value: performing the remaining DMVR process steps; and performing the final motion compensation.

9 Claims, 6 Drawing Sheets

Related U.S. Application Data continuation of application No. 17/103,822, filed on Nov. 24, 2020, now Pat. No. 11,178,426, which is a continuation of application No. PCT/CN2019/106308, filed on Sep. 18, 2019.

(51) Int. Cl.
*H04N 19/513* (2014.01)
*H04N 19/53* (2014.01)
*H04N 19/573* (2014.01)

(56) References Cited

U.S. PATENT DOCUMENTS

| | | | |
|---|---|---|---|
| 2010/0296581 A1 | 11/2010 | Metoevi et al. | |
| 2011/0109796 A1 | 5/2011 | Subedar et al. | |
| 2014/0044181 A1 | 2/2014 | Siast et al. | |
| 2015/0382009 A1* | 12/2015 | Chen | H04N 19/513 375/240.16 |
| 2018/0184117 A1 | 6/2018 | Chen et al. | |
| 2018/0192071 A1 | 7/2018 | Chuang et al. | |
| 2018/0199057 A1* | 7/2018 | Chuang | H04N 19/573 |
| 2018/0241993 A1 | 8/2018 | Panusopone et al. | |
| 2019/0089961 A1 | 3/2019 | Ahn et al. | |
| 2019/0110058 A1 | 4/2019 | Chien et al. | |
| 2019/0132606 A1* | 5/2019 | Su | H04N 19/577 |
| 2019/0238883 A1* | 8/2019 | Chen | H04N 19/56 |
| 2019/0261018 A1 | 8/2019 | Bordes et al. | |
| 2020/0007889 A1* | 1/2020 | Chao | H04N 19/423 |
| 2020/0221121 A1* | 7/2020 | Laroche | H04N 19/56 |

FOREIGN PATENT DOCUMENTS

| | | |
|---|---|---|
| CN | 108028939 A | 5/2018 |
| JP | 2017513329 A | 5/2017 |
| KR | 20160106617 A | 9/2016 |
| KR | 20170016958 A | 2/2017 |
| WO | 2015142833 A1 | 9/2015 |
| WO | 2018028559 A1 | 2/2018 |
| WO | 2018052548 A1 | 3/2018 |
| WO | 2018113658 A1 | 6/2018 |
| WO | 2018121506 A1 | 7/2018 |
| WO | 2018130206 A1 | 7/2018 |

OTHER PUBLICATIONS

Xiu et al. "Description of SDR, HDR, and 360° video coding technology proposal by Inter Digital Communications and Dolby Laboratories" Joint Video Experts Team (JVET) of ITU-T SG 16 WP 3 and ISO/IEC JTC 1/SC 29/WG 11 10th Meeting: San Diego, US, Apr. 10-20, 2018. JVET-J0015.*

X. Chen, J. An, J. Zheng, "EE3: Decoder-Side Motion Vector Refinement Based on Bilateral Template Matching," JVET-E0052, Jan. 2016.

Document: JVET-J0015-v1 ,Xiaoyu Xiu et al, Description of SDR, HDR, and 360 video coding technology proposal by InterDigital Communications and Dolby Laboratories , Joint Video Experts Team (JVET) of ITU-T SG 16 WP 3 and ISO/IECJTC 1/SC 29/WG11, 10th Meeting: San Diego, US, Apr. 10-20, 2018, total 82 pages.

Document: JVET-J1029_r4 , Semih Esenlik et al, Description of Core Experiment 9 (CE9): Decoder Side Motion Vector Derivation, Joint Video Exploration Team (JVET) of ITU-T SG 16 WP 3 and ISO/IEC JTC 1/SC 29/WG11, 10th Meeting: San Diego, US, Apr. 10-20, 2018, total 34 pages.

Document: JVET-G1001-v1,Jianle Chen et al, Algorithm Description of Joint Exploration Test Model 7 (JEM 7),Joint Video Exploration Team (JVET) of ITU-T SG 16 WP 3 and ISO/IEC JTC 1/SC 29/WG 11, 7th Meeting: Torino, IT, Jul. 13-21, 2017, total 51 pages.

Document: JVET-J0024_v2, Sri Nitchith Akula et al, Description of SDR, HDR and 360 video coding technology proposal considering mobile application scenario by Samsung, Huawei, GoPro, and HiSilicon, buJoint Video Exploration Team (JVET) of ITU-T SG 16 WP 3 and ISO/IEC JTC 1/SC 29/WG 11, 10th Meeting: San Diego, US, Apr. 10-20, 2018, total 124 pages.

JVET-K1029-v4, Semih Esenlik et al., Description of Core Experiment 9 (CE9): Decoder Side Motion Vector Derivation, Joint Video Exploration Team (JVET) of ITU-T SG 16 WP 3 and ISO/IEC JTC 1/SC 29/WG 11, 11th Meeting: Ljubljana, SI, Jul. 10, Jul. 18, 2018, 11 pages.

Zhou Yun et al., Study on the Development of Video Coding Standard VVC, Content Production and Broadcastin, Sep. 15, 2018, with an English abstract total 6 pages.

Chun-Chi, Chen, et al., Non-CE9: Early Termination Techniques for DMVR, Joint Video Experts Team (JVET) of ITU-T SG 16 WP 3 and ISO/IEC JTC 1/SC 29/WG 11 14th Meeting: Geneva, CH, Mar. 19-27, 2019, Document: JVET-N0408-V3, Switzerland, published on Mar. 21, 2019, pp. 1-3.

\* cited by examiner

DECODER-SIDE MOTION VECTOR REFINEMENT (DMVR) PROCESS METHOD AND APPARATUS

CROSS-REFERENCES TO RELATED APPLICATIONS

This application is a continuation of U.S. patent application Ser. No. 17/394,598, filed on Aug. 5, 2021, which is a continuation of U.S. patent application Ser. No. 17/103,822, filed on 24 Nov. 2020, now U.S. Pat. No. 11,178,426. which is a continuation of International Application No. PCT/CN2019/106308, filed on Sep. 18, 2019, which claims priority to Indian Provisional Patent Application No. IN201831035309, filed on Sep. 19, 2018. All of the aforementioned patent applications are hereby incorporated by reference in their entireties.

TECHNICAL FIELD

The present disclosure relates to motion compensation for video coding using decoder-side motion vector refinement. In particular, embodiments presented herein relate to methods and apparatuses for verifying an alignment level between motion compensated reference patches and skipping refinement when a difference between the two motion compensated reference patches is less than a coding unit size-dependent threshold value.

BACKGROUND OF THE INVENTION

In video compression, inter prediction is a process of using reconstructed samples of previously decoded reference pictures by specifying motion vectors relative to a current block. These motion vectors can be coded as a prediction residual by using spatial or temporal motion vector predictors. The motion vectors can be at sub-pixel accuracy. In order to derive the sub-pixel accurate pixel values in the reference frames (pictures) from the reconstructed integer position values, an interpolation filter is applied. Bi-prediction refers to a process where the prediction for the current block is derived as a weighted combination of two prediction blocks derived using two motion vectors from two reference picture areas. In this case, in addition to the motion vectors, the reference indices for the reference pictures from which the two prediction blocks are derived also need to be coded. The motion vectors for the current block can also be derived through a merge process where a spatial neighbor's motion vectors and reference indices are inherited without coding any motion vector residuals. In addition to spatial neighbors, motion vectors of previously coded reference frames are also stored and used as temporal merge options with appropriate scaling of the motion vectors to take care of the distance to the reference frames relative to the distance to the reference frames for the current block.

FIG. 1 shows a template matching based decoder-side motion vector derivation, where the template of the current block is matched with the reference template in a reference picture. Referring to FIG. 1, template matching is employed to derive motion information of the current coding unit (CU) by finding the closest match between a template (top and/or left neighboring blocks of the current CU) in the current picture (denoted "Cur Pic") and a block having the same size as that of the template in a reference picture (denoted "Ref0").

FIG. 2 shows a bilateral matching based decoder-side motion vector derivation, where a current block is predicted using two reference blocks along a motion trajectory. Referring to FIG. 2, motion information of the current block (denoted "Cur block") is derived based on two reference pictures Ref0 and Ref1. The motion information of the current block Cur block is derived by finding the best match between two blocks associated with the motion vectors MV0 and MV1 along a motion trajectory in the reference pictures Ref0 and Ref1. When the motion trajectory is a straight line, the motion vector MV0 associated with reference picture Ref0 and the motion vector MV1 associated with reference picture Ref1 are proportional to the temporal distances TD0 and TD1 between the current picture and the respective reference pictures Ref0 and Ref1.

Several methods have been proposed for performing a decoder-side motion vector refinement or derivation so that the motion vector residual coding bits can be further reduced. One class of methods, called template matching (TM) methods, use an L-shaped region adjoining the current block (as shown in FIG. 1) that has already been reconstructed, referred to as the template, and identifies a best matching L-shaped region (using cost functions such as a sum of absolute differences or mean-removed sum of absolute differences) in each reference frame using a plurality of suitably scaled spatial and temporal motion vector candidates. Then, centered on the best matching candidate, further refinement is performed within a certain refinement distance around that center. On the encoder side, rate distortion optimized cost is computed to decide between uni-prediction (i.e., prediction using the best matching reference) and bi-prediction (i.e., prediction derived by averaging the top two best matching references).

Another class of methods, called bilateral matching (BM) methods derive motion information of the current coding unit (CU) by finding the closest match between two blocks along the motion trajectory of the current CU in two different reference pictures. This is shown in FIG. 2. Under the assumption of continuous motion trajectory, the motion vectors MV0 and MV1 pointing to the two reference blocks shall be proportional to the temporal distances, i.e., TD0 and TD1, between the current picture and the two reference pictures. When the current picture is temporally between the two reference pictures and the temporal distance from the current picture to the two reference pictures is the same, the bilateral matching becomes mirror based bi-directional motion vector (MV).

In the bilateral matching merge mode, bi-prediction is always applied since the motion information of a CU is derived based on the closest match between two blocks along the motion trajectory of the current CU in two different reference pictures.

Explicit merge mode to indicate template matching merge or bilateral matching merge can be signaled to differentiate these modes from a default merge mode that does not require any decoder-side motion vector derivation.

In the bilateral matching mode, the temporal distances are ignored and bilateral matching is performed with equal and opposite motion vectors in the past and future reference frames respectively.

In some cases, no merge index is signaled while in other cases, to simplify the decoder complexity of performing multiple motion compensations, an explicit merge index is signaled.

In a variant of bilateral matching mode called decoder-side motion vector refinement (DMVR) method, a bilaterally averaged template is first created using the prediction blocks in reference lists L0 and L1 obtained from explicitly signaled merge index and bilateral matching is performed against this template. The template is updated if there is any movement. Also, in some cases, the refinement is performed in one reference and the motion vector in the other reference is obtained through mirroring of this refined motion vector. The refinement alternates between the two references until either the center position has the least error or the maximum number of iterations is reached.

In some refinement processes, a CU level refinement is first performed. Then a sub-CU level multi-candidate evaluation is performed along with the CU-level refined MVs as candidates. In other refinement processes, each sub-CU can perform its own refinement with respect to the best matching candidate.

Given the implicit decoder-side derivation or refinement process, the encoder needs to perform these steps in exactly the same manner as the decoder in order for the encoder-side reconstruction to match with the decoder-side reconstruction.

Only luma samples are typically used during the decoder side motion vector refinement or derivation process. However, chrominance is also motion compensated using the final refinement motion vectors (suitably scaled to account for any chroma downsampling) as used for luma motion compensation.

Since the merge motion vectors are sub-pixel accurate, the refinement is typically performed initially at integer distance from the respective sub-pixel accurate merge motion vectors in each reference. Since the normative motion compensation is computationally expensive, a bilinear interpolation method is commonly used to create the interpolated sample values required for performing the integer distance refinement. Other prior art techniques made proposal of using cost function values evaluated at integer distance positions and the cost function value at the position with the lowest cost when the refinement ends to obtain a parametric error surface using which sub-pixel delta motion vector corrections are estimated. Once the final integer distance plus sub-pixel distance based motion vector corrections in each reference is obtained, final normative motion compensation is performed.

BRIEF SUMMARY OF THE INVENTION

Embodiments presented herein relate to methods and apparatuses for determining the level of alignment between motion compensated reference patches against a predetermined coding unit size dependent threshold value. By determining the alignment level between motion compensated reference patches against the predetermined coding unit size dependent threshold value, computational operations of the decoder-side motion vector refinement iterations can be saved, thereby reducing power consumption in a video decoder.

Methods and apparatuses of determining an alignment level between motion compensated reference patches for reducing motion vector refinement steps are provided. According to one method, a video decoder determines the alignment level by rounding merge motion vectors, calculates the sum of absolute differences (SAD) between the two motion compensated reference patches by performing simple motion compensation using the rounded motion vectors, and determines whether the SAD is less than a CU size-dependent threshold value. When the SAD is less than the CU size-dependent threshold value, the decoder skips the remaining decoder-side motion vector process steps, and performs final motion compensation using the unrounded merge motion vectors. In one embodiment, the unrounded merge motion vectors may be rounded to a nearest integer sample position in the horizontal direction and in the vertical direction, and the final motion compensation includes performing an averaging of the integer position samples. In another embodiment, the unrounded merge motion vectors may be rounded to the nearest half-pixel sample position in the horizontal direction and in the vertical direction to obtain half-pixel position samples, and the final motion compensation includes performing an averaging of the half-pixel position samples. The method is advantageous in that whenever the SAD is less than a predetermined threshold value, the video decoder determines that the alignment level between motion compensated reference patches is acceptable and the video decider can skip the motion vector refinement processes such as bilinear interpolation, mean value determination, refinement cost function evaluations, and other process steps to save clock cycles and reduce power consumption. In another method, the video decoder calculates the SAD between the two motion compensated reference patches using a subset of samples from a bilinear motion compensated interpolation using sub-pixel accurate merge motion vectors. The SAD is then compared with a coding unit (CU) size-dependent threshold value. The bit depth of the coding unit size-dependent threshold value can be adjusted according to the bit depth of the interpolated samples. By computing only the SAD using a subset of interpolated samples, the method advantageously requires fewer operations (clock cycles). In yet another method, the decoder calculates a mean-reduced SAD (MR-SAD) between motion compensated interpolated samples at center positions of respective motion compensated reference patches and determines whether the MR-SAD is less than a CU size-dependent threshold value. In this method, the MR-SAD of the center positions of the two motion compensated reference patches is computed where the refinement begins. When the MR-SAD for the center positions is less than the CU size-dependent threshold value, the video decoder skips the remaining of the decoder-side motion vector refinement process. An inter prediction method, comprising: obtaining a first motion compensated reference patch and a second motion compensated reference patch based on initial motion vectors of Merge Mode; computing a patch difference value between the first motion compensated reference patch and the second motion compensated reference patch; obtaining a prediction value of a current block based on the initial motion vectors in the event that the patch difference value is less than a threshold, wherein the threshold is determined based on a size of the current block; and refining the initial motion vectors to obtain the perdition value of the current block in the event that the patch difference value is greater than or equal to the threshold. In a feasible implementation, the initial motion vectors are derived from motion vectors of a neighboring block of the current block. In a feasible implementation, the initial motion vectors comprises a first motion vector and a second motion vector, wherein the first motion compensated reference patch is obtained according to the first motion vector, and the second motion compensated reference patch is obtained according to the second motion vector. In a feasible implementation, the patch difference value is a SAD value or a mean-reduced SAD value. In a feasible implementation, computing the patch difference value between the first motion compensated reference patch and the second motion compensated reference patch, comprising: computing the patch difference value between a subset samples of the first motion compensated reference patch and a corresponding subset samples of the second motion compensated reference patch. In a feasible implementation, after computing the patch difference value between the first motion compensated reference patch and the second motion compensated reference patch, further comprising: performing a comparison based on the patch difference value and the threshold. In a feasible implementation, before performing the comparison based on the patch difference value and the threshold, further comprising: adjusting the threshold after determining the threshold according to the size of the current block. In a feasible implementation, in the event that the patch difference value is less than the threshold, before obtaining the prediction value of the current block based on the initial motion vectors, further comprising: determining decoder-side motion vector refinement (DMVR) is skipped. In a feasible implementation, in the event that the patch difference value is less than the threshold, obtaining the prediction value of the current block using motion vectors that are the same as the initial motion vectors. An inter prediction apparatus, comprising: a non-transitory memory having processor-executable instructions stored thereon; and a processor, coupled to the memory, configured to execute the processor-executable instructions to facilitate the method according to any one of feasible implementation of the above inter prediction method. These novel techniques save substantial iterations of the motion vector refinement, thereby reducing the number of clock cycles and power consumption of the video decoder.

DETAILED DESCRIPTION OF THE INVENTION

Figure 1:
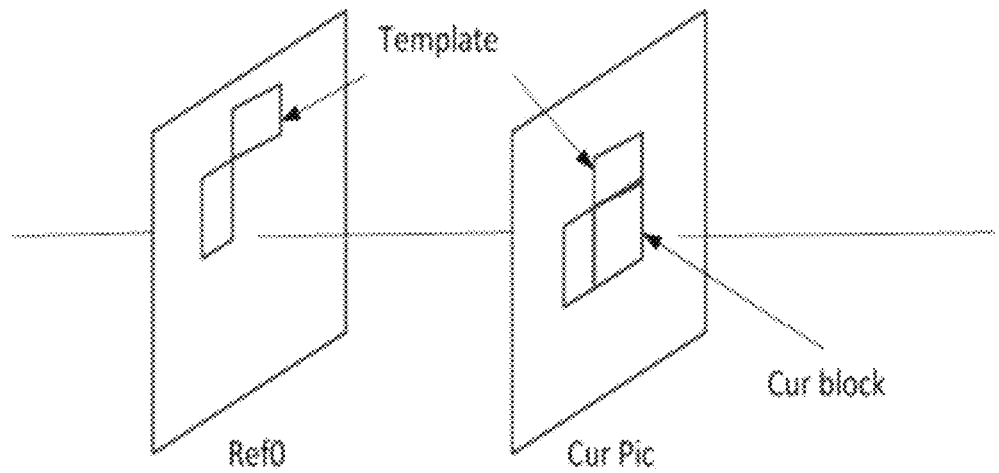
FIG. 1 shows a template matching based decoder-side motion vector derivation, where the template of the current block is matched with the reference template in a reference picture.
Figure 2:
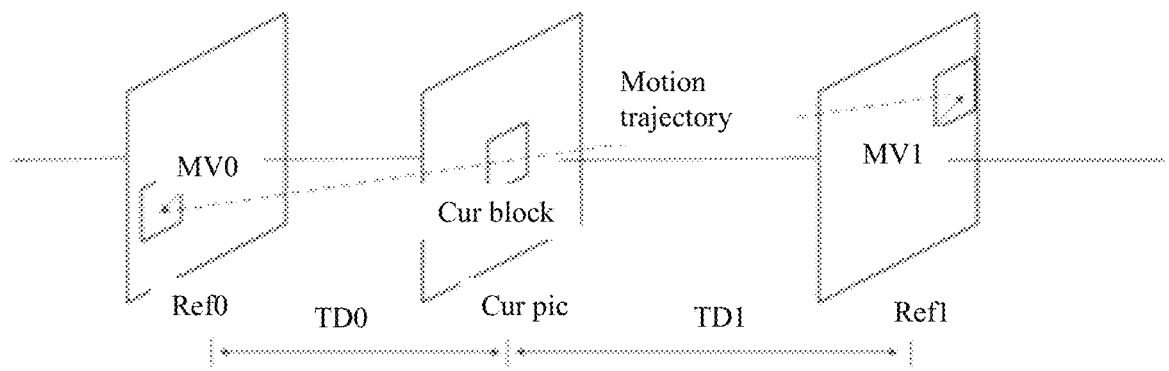
FIG. 2 shows a bilateral matching based decoder-side motion vector derivation, where a current block is predicted using two reference blocks along a motion trajectory.

The present disclosure relates to versatile video coding standardization which was earlier pursued as a Joint Exploratory Model (JEM) within Joint Video Exploration Team which is a joint work between Q16 of VCEG and MPEG (SC29/WG11). Document JVET-G1001 and other Huawei prior art relating to decoder-side motion vector refinement and decoder-side motion vector derivation can be used to get a list of contribution documents and patents related to the disclosure herein.

As explained above, the bilateral matching process tries to improve the level of alignment between the motion compensated blocks in the two references involved in bi-prediction. In order to avoid coding an extra flag, the preferred option is for all merge mode inter-coded coding units to be eligible for decoder-side motion vector refinement. However, it is noticed that quite a good number of coding units have very good alignment already at the merge mode motion vectors and do not have much room for improvement through refinement. Since refinement involves performing cost function evaluations at multiple positions within the refinement range, avoiding these operations when there is no possible improvement that can result in considerable reduction of average decoder complexity which can translate to attributes such as better battery life or lower consumption of energy. Some prior art methods have proposed skipping the refinement if the level of alignment between the two normative motion compensated patches obtained from the merge motion vectors in bi-predictive merge mode coding units is less than a pre-determined threshold for each coding-unit size. However, given the fact that bilinear interpolation is commonly employed to create the samples used for performing refinement, prior art would still require a normative motion compensation for checking whether refinement can be skipped, bilinear interpolation for performing the refinement, and final normative motion compensation with the sub-pixel accurate refinement motion vectors. Since the normative 8-tap interpolation filters are quite computational expensive, performing the interpolation filtering twice makes the worst-case complexity higher than without the test for skipping the refinement. Also, from a hardware timing point of view, the sum of absolute difference evaluation adds a dependent stage that reduces the clocks available for refinement.

Hence there is a need to harmonize the concept of checking to skip the refinement iterations without increasing the interpolation cycles (when compared to the bilinear interpolation based refinement with final exact motion compensation using refined motion vectors) and without worsening the worst-case timing constraints for hardware implementations.

Motion vector (MV) refinement is a pattern based MV search with the criterion of bilateral matching cost or template matching cost. In the current development, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

In bi-prediction operation, for the prediction of one block region, two prediction blocks, formed using a MV of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 3:
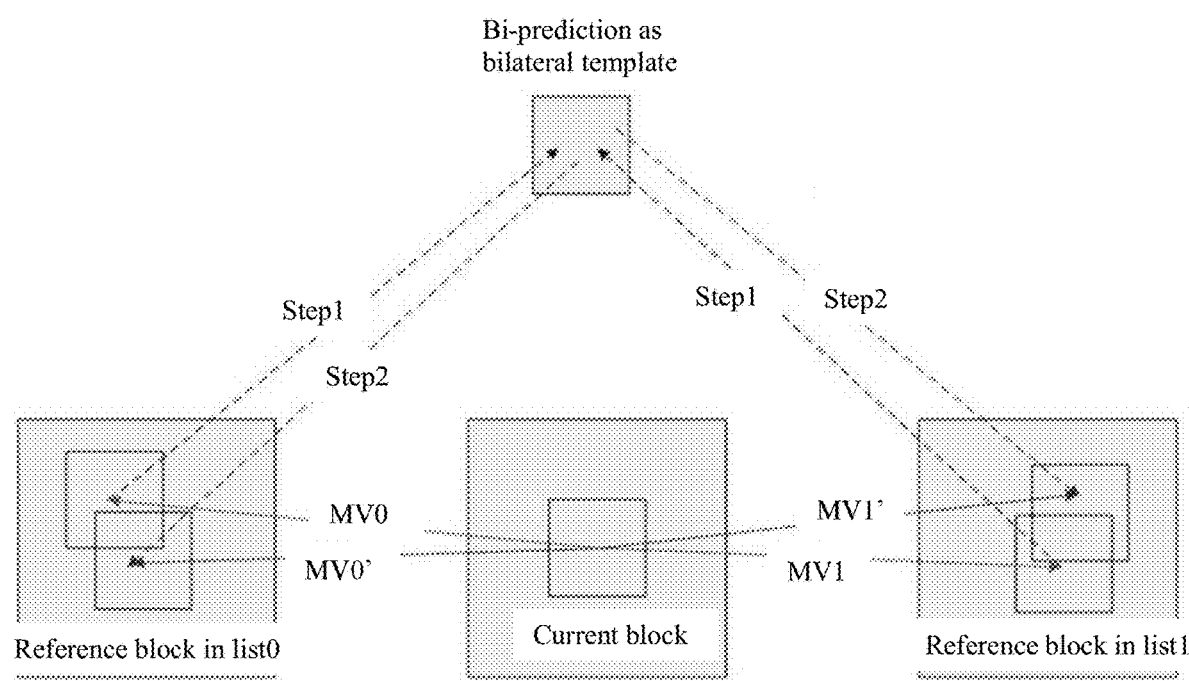
FIG. 3 shows an example of a bilateral template matching based decoder-side motion vector refinement (DMVR), where a template is generated by using the bi-prediction from the prediction blocks referred by the initial motion vectors MV0 and MV1 and the bilateral template matching to find the best matched blocks referred by the updated motion vectors MV0' and MV1'.

FIG. 3 shows an example of a bilateral template matching based decoder-side motion vector refinement (DMVR), where a template is generated by using the bi-prediction from the prediction blocks referred by the initial MV0 and MV1 and the bilateral template matching to find the best matched blocks referred by the updated MV0' and MV1'. First, the best match MV is set for the current block in a merge mode to be the candidate MV0 in list0. Similarly, the best match MV is set for the current block (in the merge mode) to be the candidate MV in list1. The reference pixels are then averaged to form a template. Next, using the template, the surrounding regions of the candidate MVs of the first and second reference pictures are searched, and the MV with the lowest cost is determined to be the final MV. The cost value may be calculated using a sum of differences between each pixel in the template and each pixel in the regions searched. Referring to FIG. 3, in step 1, a bilateral template is generated from the prediction blocks referred to by the initial motion vectors MV0 and MV1 in the reference blocks in list0 and list1, respectively.

In step 2, a bilateral matching is to find the best matched blocks referred by the updated motion vectors MV0' and MV1'. The template matching operation includes calculating cost measures between the generated template and the sample region (around the initial prediction block) in the reference picture. For each of the two reference pictures, the MV that yields the minimum template cost is considered as the updated MV of that list to replace the original one. In the current development, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1', are used for generating the final bi-prediction results. A sum of absolute differences (SAD) is used as the cost measure. DMVR is applied for the merge mode of bi-prediction with one MV from a reference picture in the past and another from a reference picture in the future, without the transmission of additional syntax elements.

In various embodiments, the difference between two motion compensated reference patches is compared or measured against a pre-determined coding unit size dependent threshold value, and the refinement is skipped based on the comparison or measurement result. The difference between two motion compensated reference patches is performed either using pre-interpolation samples or using a subset of the bilinear interpolated samples. Also, in some embodiments, a mean-removed sum of absolute differences (MR-SAD) of the patches may be used as the error metric for refinement, simple sum of absolute differences of the patches may be used as the metric on which the skipping check is performed in order to allow saving of the mean computations on the average and also to help with the worst-case timing requirements. The pre-determined threshold value is adapted to the lower bit-depths that may be employed during or after interpolation to reduce the buffer size and processing requirements.

Given that decoder-side motion vector refinement/derivation is a normative aspect of a coding system, the encoder will also have to perform the same error surface technique in order to not have any drift between the encoder's reconstruction and the decoder's reconstruction. Hence, all aspects of all embodiments are applicable to both encoding and decoding systems. Embodiments provided below are merely some examples for understanding the present disclosure and thus should not understood as being intended to be limiting.

Embodiment 1

In this embodiment, the merge motion vectors are rounded to the nearest integer position. Using these rounded integer grid motion vectors as the offset with respect to the current coding unit position in the two references used for bi-prediction, a sum of absolute differences (SAD) between the blocks of coding unit size samples is computed. This sum of absolute differences is compared against a coding unit (CU) size-dependent threshold value and the rest or remaining of the decoder-side motion vector refinement process steps is normatively skipped when the sum of absolute differences is less than the threshold value.

The appropriate pre-determined CU size-dependent threshold value is determined based on the desired average computational savings or energy saving traded-off against the drop in compression gains with a high threshold.

Figure 4:
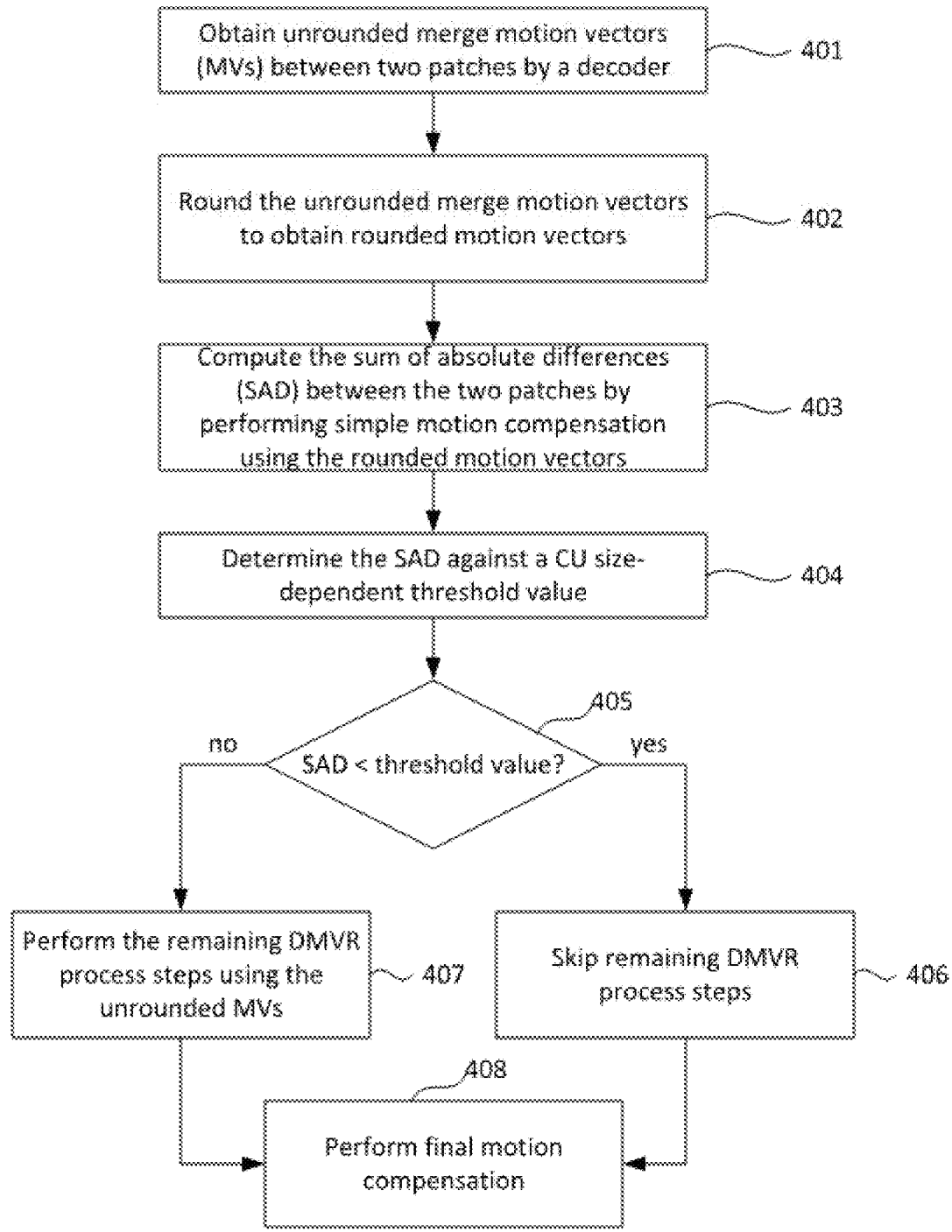
FIG. 4 is a simplified flowchart illustrating a method of determining an alignment level between motion compensated reference patches according to an embodiment presented herein, where the conditional skipping of the refinement process steps is based on a rounded integer position-based cost function.

FIG. 4 is a simplified flowchart of a method using decoder-side verification or determination of an alignment level between motion compensated patches according to an embodiment presented herein, where the conditional skipping of the remaining refinement process steps is based on a rounded integer position-based cost function. The steps shown in the flowchart may be implemented as program codes or instructions executable on one or more processors at the encoder side or the decoder side. The steps shown in the flowchart may be implemented using electronic components, digital and/or analog circuitry, logic elements, hardware, software, firmware, or combinations thereof. The method may include, at step 401, a video decoder (video decoder and decoder are interchangeably used herein) obtains unrounded merge motion vectors between two motion compensated reference patches. A patch has a pre-determined size of a current block of M×N pixels, M and N each are positive integers. In some embodiments, M may be equal to N. In other embodiments, M and N may be different. A patch may be a prediction unit or a coding unit and is referred to as a block of samples within a picture (frame). The unrounded merge motion vectors can be obtained using bilateral matching, template matching, or other techniques. Unrounded merge motion vectors can be merge motion vectors having an integer pixel precision or a fractional pixel precision. The decoder rounds the unrounded merge motion vectors to obtain the rounded motion vectors at step 402. Rounding operation may include converting an unrounded motion vector to an integer pixel accuracy motion vector or reducing the pixel precision of the motion vector. For example, a fractional precision motion vector can be rounded to an integer pixel precision motion vector. The rounding operation may include the right shifting of the vector value by one or more bits. In one embodiment, the video decoder may round the unrounded merge motion vectors to the nearest integer sample positions. In another embodiment, the video decoder may round the unrounded merge motion vectors to the nearest half-pixel sample positions.

At step 403, the video decoder computes (calculates) a sum of absolute differences (SAD) between the two motion compensated reference patches by performing simple motion compensation using the rounded motion vectors. The sum of differences SAD (first patch, second patch) in the respective reference pictures Ref0, Ref1 is a cost function for determining the best template match in the respective search spaces. At step 404, the decoder compares the SAD with a coding unit (CU) size-dependent threshold value to determine whether the SAD is less than or not less than (i.e., equal to or greater than) the CU size-dependent threshold value. When the SAD is determined to be less than the CU size-dependent threshold value ("yes" in step 405), the decoder skips the decoder-side motion vector refinement (DMVR) process steps (step 406) and performs the final motion compensation using the unrounded merge motion vectors (step 408). When the SAD is determined to be not less than the CU size-dependent threshold value ("no" in step 405), the decoder performs the decoder-side motion vector refinement (DMVR) process steps (step 407), and then performs the final motion compensation (step 408). The decoder may refine the motion vector candidates based on a reference block in a search window that closely matches the current block, i.e., the decoder may determine a new interpolated motion vector (e.g., using bilinear interpolation) for the current block when the SAD is not less than the CU size-dependent threshold value, thereafter, the decoder then performs the final motion compensation for the current block. In one embodiment, performing the final motion compensation may include rounding the unrounded merge motion vectors to the nearest integer sample position in the horizontal direction and in the vertical direction to obtain integer position samples, and performing an averaging operation on the integer position samples. In another embodiment, performing the final motion compensation may include rounding the unrounded merge motion vectors to the nearest half-pixel sample position in the horizontal direction and in the vertical direction to obtain half-pixel position samples, and performing an averaging operation on the half-pixel position samples.

This embodiment is advantageous, among other advantages, in that whenever the metric evaluated is less than the threshold value, all others aspects of decoder-side motion vector refinement such as bilinear interpolation, mean value determination, and refinement cost function evaluations at different positions, can be skipped and the final normative motion compensation can be performed. It should be noted that in hardware implementations, it is possible in some embodiments to speculatively perform bilinear interpolation in parallel with the evaluation of the metric for skipping the refinement to improve the timing constraint (i.e., obtain more time or clock cycles to perform the refinement tasks).

Embodiment 2

In this embodiment, the decoder computes the sum of absolute differences between the motion compensated patches in the two references involved in bi-prediction using a subset of samples from the bilinear motion compensated interpolation performed using the sub-pixel accurate merge motion vectors. This sum of absolute differences is then compared against a pre-determined coding unit size dependent threshold value and the rest of the refinement steps are normatively skipped when the decoder determines that the sum of absolute differences is less than the threshold value.

In one exemplary implementation, the bilinear motion compensated interpolation is performed in parallel (concurrently) on both the reference patches. In another embodiment, the production of the interpolated samples across the two references are interleaved. In both these cases, the sum of absolute difference calculation is advantageously computed at the earliest possible time rather than waiting for all interpolated samples to be produced. This process also avoids loading the interpolated samples again. This reduces the hardware latency and improves the time available to perform the remaining refinement computations required for the worst-case path.

In some implementations, a block of samples with the dimensions (size) equal to the coding unit dimensions are used for computing the sum of absolute differences. In such embodiments, the computation of interpolated samples required for the refinement positions other than the central position can be skipped when the sum of absolute differences is determined to be less than the threshold value. In other embodiments, only a subset of interpolated samples are utilized for computing the sum of absolute differences. In these cases, the pre-determined threshold value is modified to be a function of the number of samples used for the sum of absolute differences. When the decoder determines that the sum of absolute differences is less than the threshold value, the remaining interpolation also can be skipped. In one embodiment, the subset of interpolated samples can be (coding_unit_width−2)*(coding_unit_height−2) samples in one embodiment. In another embodiment, the subset of interpolated samples can be (coding_unit_width*coding_unit_height−(coding_unit_width−2)*(coding_unit_height-2)) samples in another embodiment, where coding_unit_width is a width of the coding unit, and coding_unit_height is a height of the coding unit.

When bilinear interpolation constrains the bit depth of the interpolated samples, the pre-determined threshold is also adjusted accordingly by shifting down the threshold value derived at unconstrained bit-depth of the interpolated samples.

Figure 5:
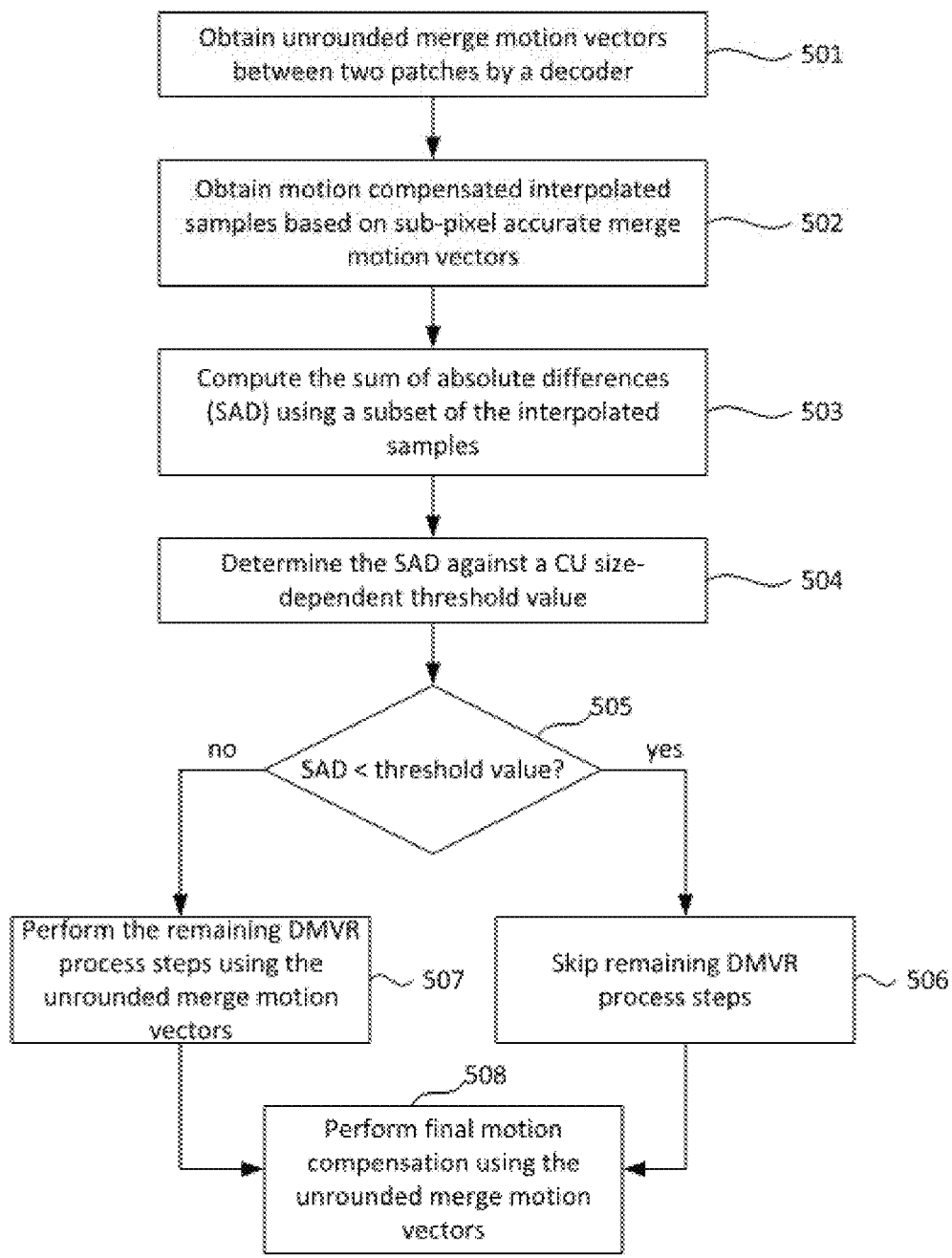
FIG. 5 shows a simplified flowchart of a method using decoder-side verification, checking or determination of an alignment level between motion compensated patches according to an embodiment presented herein, where the conditional skipping of the refinement process steps is based on a sum of absolute differences between two motion compensated reference patches using a subset of motion compensated interpolated samples.

FIG. 5 shows a simplified flowchart of a method using decoder-side verification, checking or determination of an alignment level between motion compensated patches according to an embodiment presented herein, where the conditional skipping of the decoder-side motion vector refinement process steps is based on a subset of the bilinear motion compensated interpolated samples. The steps shown in the flowchart may be implemented as program codes or instructions executable on one or more processors at the encoder side or the decoder side. The steps shown in the flowchart may also be implemented using electronic components, digital and/or analog circuitry, logic elements, hardware, software, firmware, or combinations thereof. The method may include, at step 501, a video decoder obtains unrounded merge motion vectors associated with two motion compensated reference patches. A patch has a pre-determined size of a current block of M×N pixels, M and N each are positive integers. In some embodiments, M and N may be the same. In other embodiments, M and N may be different. The unrounded merge motion vectors can be obtained using bilateral matching, template matching, or other techniques. The decoder also obtains motion compensated interpolated samples based on sub-pixel accurate merge motion vectors at step 502.

At step 503, the decoder computes (calculates) a sum of absolute difference (SAD) between the two motion compensated reference patches using a subset of the motion compensated interpolated samples. In some embodiments, the SAD can be computed in parallel or concurrently alongside the interpolation process. At step 504, the decoder compares the SAD with a coding unit (CU) size-dependent threshold value to determine whether the SAD is less than or not less than the CU size-dependent threshold value. In one embodiment, the CU size-dependent threshold value is a function of the number of samples in the subset of the interpolated samples. When the SAD is determined to be less than the CU size-dependent threshold value ("yes" in step 505), the decoder skips the decoder-side motion vector refinement (DMVR) process steps (step 506) and performs the final motion compensation using the unrounded merge motion vectors (step 508). When the SAD is determined to be not less than (i.e., equal to or greater than) the CU size-dependent threshold value ("no" in step 505), the decoder performs the decoder-side motion vector refinement (DMVR) process steps using the unrounded merge motion vectors (step 507), and then performs the final motion compensation using the unrounded merge motion vectors (step 508). The decoder may refine the motion vector candidates based on a reference block in a search window that closely matches the current block, i.e., the decoder may determine a new interpolated motion vector (e.g., using bilinear interpolation) for the current block when the SAD is not less than the CU size-dependent threshold value, thereafter, the decoder then performs the final motion compensation for the current block using the unrounded merge motion vectors.

The second embodiment (embodiment 2) allows less coding gain decrease as a conservative threshold can still allow many coding units to skip the remaining steps of the refinement process. From a timing point of view, the sum of absolute difference operations required for the determination or verification of the SAD against the threshold can be substantially hidden against the bilinear interpolation step and thus will not impact the worst-case timing constraint.

Embodiment 3

In this embodiment, the early exit check (determination) is performed using the mean-removed sum of absolute differences (MR-SAD) computed for the center position where the refinement starts. In some embodiments, the center position's MR-SAD is evaluated first and compared against a coding unit size dependent threshold. If the MR-SAD for the center position is less than the threshold value, then the rest of the refinement process is skipped normatively.

In some embodiments, it is possible that MR-SAD evaluations at positions other than the center position (e.g. certain positions within the first iteration refinement points) may be evaluated alongside the MR-SAD evaluation of the center position. However, these evaluated MR-SADs will have no effect when the center position's MR-SAD is less than the pre-determined threshold value.

When interpolation constrains the bit depth of the interpolated samples, the pre-determined threshold value is also adjusted accordingly by shifting down the threshold value derived at the unconstrained bit-depth of the interpolated samples.

Figure 6:
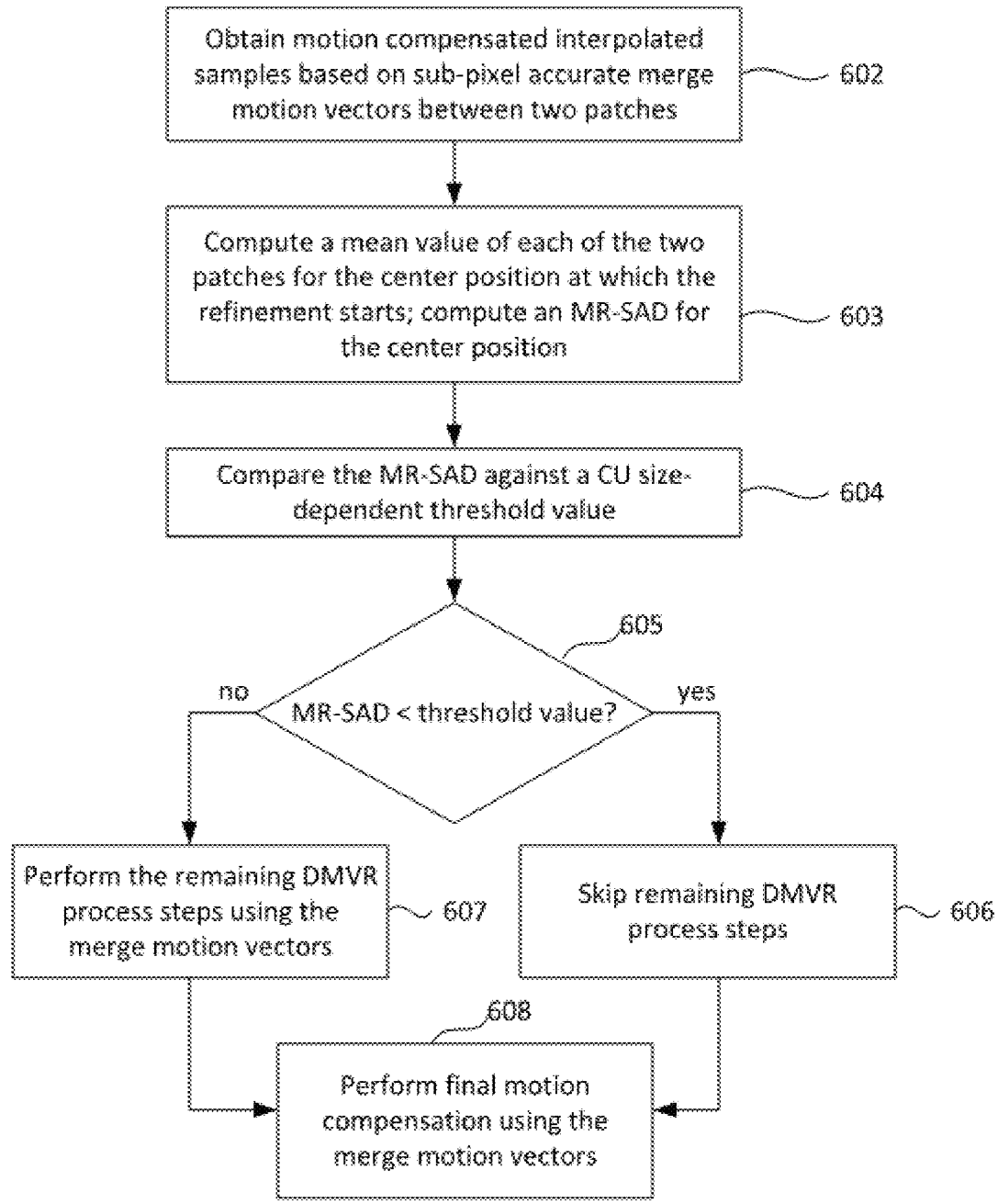
FIG. 6 shows a simplified flowchart of a method using decoder-side verification, checking or determination of an alignment level between motion compensated patches according to an embodiment presented herein, where the conditional skipping of the refinement process steps is based on a mean-reduced sum of absolute differences between motion compensated interpolated samples at center positions of respective motion compensated reference patches.

FIG. 6 shows a simplified flowchart of a method using decoder-side verification, checking or determination of an alignment level between motion compensated patches according to an embodiment presented herein, where the conditional skipping of the decoder-side motion vector refinement process steps is based on a mean-removed sum of absolute differences of the refinement start positon. The steps shown in the flowchart may be implemented as program codes or instructions executable on one or more processors at the encoder side or the decoder side. The steps shown in the flowchart may also be implemented using electronic components, digital and/or analog circuitry, logic elements, hardware, software, firmware, or combinations thereof. The method may begin, at step 602, a video decoder obtains motion compensated interpolated samples based on sub-pixel accurate merge motion vectors between two motion compensated reference patches. At step 603, the decoder computes (calculates) a mean value of each of the patches for the center position at which the refinement starts. The decoder also computes (at 603) a mean-removed sum of absolute differences (MR-SAD) for the center position.

At 604, the decoder compares the MR-SAD against a coding unit (CU) size-dependent threshold value to determine whether the MR-SAD is less than or not less than (equal to or greater than) the CU size-dependent threshold value. In one embodiment, the CU size-dependent threshold value is a function of the bit depth of the sub-pixel accurate merge motion vectors. When the MR-SAD is determined to be less than the CU size-dependent threshold value ("yes" in step 605), the decoder skips the decoder-side motion vector refinement (DMVR) process steps (step 606) and performs the final motion compensation using the merge motion vectors (step 608). When the MR-SAD is determined to be not less than the CU size-dependent threshold value ("no" in step 605), the decoder performs the decoder-side motion vector refinement (DMVR) process steps using the merge motion vectors (step 607), and then performs the final motion compensation using the merge motion vectors (step 608). The decoder may refine the motion vector candidates based on a reference block in a search window that closely matches the current block, i.e., the decoder may determine a new interpolated motion vector (e.g., using bilinear interpolation) for the current block when the MR-SAD is not less than the CU size-dependent threshold value, thereafter, the decoder then performs the final motion compensation for the current block using the merge motion vectors.

In some embodiments, computing the mean value of a patch may include averaging the luma intensity of all of the pixels within the corresponding reference patch. The mean-removed sum of absolute differences (MR-SAD) may be computed using the following expression:

$$MR\text{-}SAD = SAD(\text{first\_sample} - \text{mean}(\text{first\_patch}), \text{second\_sample} - \text{mean}(\text{second\_patch}))$$

Where first_sample represents the first motion compensated interpolated sample at the center of the first motion compensated reference patch, the second motion compensated interpolated sample at the center of the second motion compensated reference patch, mean(first_block) represents an averaging operation of sample values of the first_block, mean(second_block) represents an averaging operation of sample values of the second_block, the (first, second) patch may have a width and height of the (first, second) block in terms of samples, and SAD is a summing operation of absolute differences of the values of samples of the first patch and the samples of the second patch.

This embodiment can ensure that no additional computations are incurred for performing the conditional skipping of refinement check over what is required without such a check. Statistically, the computations of the refinement iterations are saved which can result in power savings and average cycle reduction in software.

The flowcharts shown and described above are intended to illustrate exemplary embodiments of determination, checking or verification of the alignment between motion compensated patches according to the embodiments presented herein. As one skilled in the art knows, the alignment checking and determination steps described herein may be re-arranged, modified, or combined to practice the present embodiments without departing from the scope of the present disclosure.

Embodiments in accordance with the present disclosure may be implemented in hardware circuitry, software program codes, computer instructions executable by one or more processors or CPUs, or combination thereof. For example, embodiments can be one or more integrated circuits or devices that perform the steps described herein. The program codes can be executed on a digital signal processor (DSP). Embodiments can also be implemented by one or microprocessors, one or more field programmable gate array (FPGAs).

Embodiments in accordance with the present disclosure provide an apparatus for determining the level of alignment between motion compensated reference patches (coding units, blocks) against a predetermined CU size-dependent threshold value. The apparatus may include circuitry configured to obtain unrounded merge motion vectors between two motion compensated reference patches; round the unrounded merge motion vectors to the nearest integer sample position to obtain rounded motion vectors; compute the sum of absolute differences (SAD) between the two motion compensated reference patches using the rounded motion vectors; and determine whether the SAD is less than a CU size-dependent threshold value. In the event that the SAD is less than the CU size-dependent threshold value, the circuitry of the apparatus skips remaining steps of a decoder-side motion vector refinement process and perform the final motion compensation using the unrounded merge motion vectors. In the event that the SAD is not less than the CU size-dependent threshold value, the circuitry of the apparatus performs the remaining steps of a decoder-side motion vector refinement process, and then perform the final motion compensation using the unrounded merge motion vectors.

In one embodiment, the circuitry of the apparatus derives the SAD using a subset of motion compensated interpolated samples instead of using the rounded motion vectors.

In one embodiment, the circuitry of the apparatus computes a mean-removed sum of absolute differences (MR-SAD) for the integer pixel motion search and compare the MR-SAD against the CU size-dependent threshold value.

In some embodiments, the circuitry of the apparatus may include an integrated semiconductor device or chip. In other embodiments, the circuitry may include hardware components or device or a combination of hardware and software, e.g., one or more processors, programmable devices, or DSPs operable with instructions or program codes.

Following is an explanation of the applications of the encoding method as well as the decoding method as shown in the above-mentioned embodiments, and a system using them.

Figure 7:
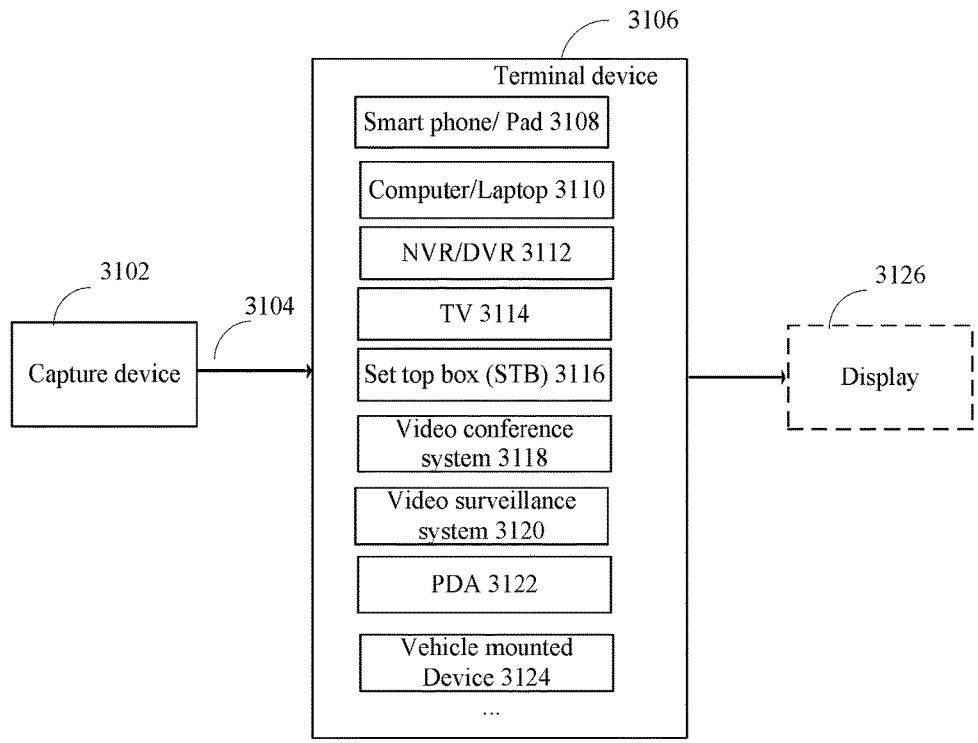
FIG. 7 is a block diagram showing an example structure of a content supply system 3100 which realizes a content delivery service.

FIG. 7 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 8:
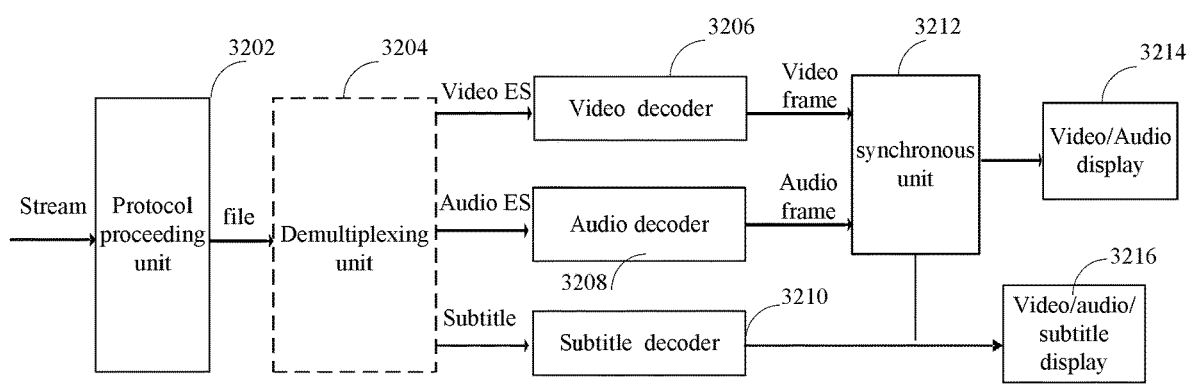
FIG. 8 is a block diagram showing a structure of an example of a terminal device.

FIG. 8 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

The invention claimed is:

1. A method of determining an alignment level between motion compensated reference patches, the method comprising:
   obtaining, by a decoder, sub-pixel accurate merge motion vectors of a current block;
   obtaining, by the decoder, motion compensated interpolated samples based on the sub-pixel accurate merge motion vectors from a bilinear motion compensated interpolation;
   computing, by the decoder, a sum of absolute differences (SAD) between the two motion compensated reference patches using a subset of the motion compensated interpolated samples, wherein the number of samples in the subset of the motion compensated interpolated samples is less than the number of samples in the motion compensated interpolated samples;
   determining, by the decoder, whether the SAD is less than a coding unit (CU) size-dependent threshold value;
   when the SAD is less than the CU size-dependent threshold value:
   skipping remaining decoder-side motion vector refinement (DMVR) process steps; and
   performing final motion compensation based on the sub-pixel accurate merge motion vectors of the current block; and
   when the SAD is greater than or equal to the CU size-dependent threshold value:
   performing the remaining DMVR process steps; and
   performing the final motion compensation based on the sub-pixel accurate merge motion vectors of the current block and motion vector corrections;
   wherein the remaining DMVR process steps comprises:
   performing integer distance refinement initially at integer distance from the sub-pixel accurate merge motion vectors, to obtain cost function values at integer distance positions, wherein a position with a lowest cost function value corresponds to a final integer distance;
   obtaining sub-pixel distance based on the cost function values at the integer distance positions and the cost function value at the position with the lowest cost function value;
   obtaining the motion vector corrections based on the final integer distance and the sub-pixel distance.

2. The method of claim 1, wherein the subset of the motion compensated interpolated samples comprises (CU_width−2)*(CU height−2) samples, and wherein CU_width is a width of the coding unit and CU-height is a height of the coding unit.

3. The method of claim 1, wherein the subset of the motion compensated interpolated samples comprises (CU_width*CU_height−(CU_width−2)*(CU_height−2)) samples, and wherein CU_width is a width of the coding unit and CU-height is a height of the coding unit.

4. An inter prediction apparatus, comprising:
   a non-transitory memory having processor-executable instructions stored thereon; and
   one or more processors, coupled to the memory, configured to execute the processor-executable instructions to cause the inter prediction apparatus to
   obtain sub-pixel accurate merge motion vectors of a current block;
   obtain motion compensated interpolated samples based on the sub-pixel accurate merge motion vectors from a bilinear motion compensated interpolation;
   compute a sum of absolute differences (SAD) between two motion compensated reference patches using a subset of the motion compensated interpolated samples, wherein the number of samples in the subset of the motion compensated interpolated samples is less than the number of samples in the motion compensated interpolated samples;
   determine whether the SAD is less than a coding unit (CU) size-dependent threshold value;
   when the SAD is less than the CU size-dependent threshold value:
   skip remaining decoder-side motion vector refinement (DMVR) process steps; and
   perform final motion compensation based on the sub-pixel accurate merge motion vectors of the current block; and
   when the SAD is greater than or equal to the CU size-dependent threshold value:
   perform the remaining DMVR process steps; and
   perform the final motion compensation based on the sub-pixel accurate merge motion vectors of the current block and motion vector corrections;

wherein the remaining DMVR process steps comprises:
perform integer distance refinement initially at integer distance from the sub-pixel accurate merge motion vectors, to obtain cost function values at integer distance positions, wherein a position with a lowest cost function value corresponds to a final integer distance;
obtain sub-pixel distance based on the cost function values at the integer distance positions and the cost function value at the position with the lowest cost function value;
obtain the motion vector corrections based on the final integer distance and the sub-pixel distance.

5. The inter prediction apparatus of claim 4, wherein the subset of the motion compensated interpolated samples comprises (CU_width−2)*(CU_height−2) samples, and wherein CU_width is a width of the coding unit and CU-height is a height of the coding unit.

6. The inter prediction apparatus of claim 4, wherein the subset of the motion compensated interpolated samples comprises (CU_width*CU_height−(CU_width−2)*(CU height−2)) samples, and wherein CU_width is a width of the coding unit and CU-height is a height of the coding unit.

7. A non-transitory computer-readable medium storing processor-executable instructions for one or more processors, when executed by the one or more processors, causing the one or more processors to perform steps of
obtaining sub-pixel accurate merge motion vectors of a current block;
obtaining motion compensated interpolated samples based on the sub-pixel accurate merge motion vectors from a bilinear motion compensated interpolation;
computing a sum of absolute differences (SAD) between the two motion compensated reference patches using a subset of the motion compensated interpolated samples, wherein the number of samples in the subset of the motion compensated interpolated samples is less than the number of samples in the motion compensated interpolated samples;
determining whether the SAD is less than a coding unit (CU) size-dependent threshold value;
when the SAD is less than the CU size-dependent threshold value:
skipping remaining decoder-side motion vector refinement (DMVR) process steps; and
performing final motion compensation based on the sub-pixel accurate merge motion vectors of the current block; and
when the SAD is greater than or equal to the CU size-dependent threshold value:
performing the remaining DMVR process steps; and
performing the final motion compensation based on the sub-pixel accurate merge motion vectors of the current block and motion vector corrections;
wherein the DMVR process steps comprises:
performing integer distance refinement initially at integer distance from the sub-pixel accurate merge motion vectors, to obtain cost function values at integer distance positions, wherein a position with a lowest cost function value corresponds to a final integer distance;
obtaining sub-pixel distance based on the cost function values at the integer distance positions and the cost function value at the position with the lowest cost function value;
obtaining the motion vector corrections based on the final integer distance and the sub-pixel distance.

8. The non-transitory computer-readable medium of claim 7, wherein the subset of the motion compensated interpolated samples comprises (CU_width−2)*(CU height−2) samples, and wherein CU_width is a width of the coding unit and CU-height is a height of the coding unit.

9. The non-transitory computer-readable medium of claim 7, wherein the subset of the motion compensated interpolated samples comprises (CU_width*CU_height−(CU_width−2)*(CU_height−2)) samples, and wherein CU_width is a width of the coding unit and CU-height is a height of the coding unit.

* * * * *